United States Patent
Wan et al.

(10) Patent No.: US 7,521,038 B2
(45) Date of Patent: Apr. 21, 2009

(54) METHOD FOR PRODUCING HYDROGEN BY USING MAGNESIUM SCRAP AND APPARATUS THEREOF

(75) Inventors: Jin-ten Wan, Taipei Hsien (TW); Tsang-lin Hsu, Taipei Hsien (TW)

(73) Assignee: Liung Feng Industrial Co., Ltd., Taipei Hsien (TW)

(*) Notice: Subject to any disclaimer, the term of this patent is extended or adjusted under 35 U.S.C. 154(b) by 317 days.

(21) Appl. No.: 11/523,525

(22) Filed: Sep. 20, 2006

(65) Prior Publication Data
US 2008/0069767 A1    Mar. 20, 2008

(51) Int. Cl.
*C01B 3/08* (2006.01)
*B01J 19/00* (2006.01)
*B01J 8/00* (2006.01)

(52) U.S. Cl. .................... 423/657; 423/648.1; 422/129; 422/198

(58) Field of Classification Search ......... 422/129–242; 423/648.1, 657
See application file for complete search history.

(56) References Cited

OTHER PUBLICATIONS

Chi-Yuan Cho, "Evaluation of a New Hydrogen Generating System: Ni-Rich Magnesium Alloy Catalyzed by Platinum Wire in Sodium Chloride Solution," Dec. 15, 2005, Materials Transactions, vol. 46, No. 12, pp. 2704-2708.*

* cited by examiner

*Primary Examiner*—Alexa D Neckel
*Assistant Examiner*—Imran Akram
(74) *Attorney, Agent, or Firm*—Rosenberg, Klein & Lee

(57) ABSTRACT

A method for producing hydrogen by using magnesium scrap is provided. First, adhering the melting magnesium scrap to platinum-coating titanium meshes, and putting the adhered meshes in an airtight reaction chamber, which is loaded with sodium chloride solution, to carry out a spontaneously hydrogen producing reaction. The gas produced by the reaction is then conducted to a low temperature exsiccator for condensing the vapor involved in the gas. Next, the gas is collected by a collector immediately. The apparatus comprises a sodium chloride solution container, an airtight reaction chamber, a low temperature exsiccator, and a gas collector. Ducts connect with each component and control the gas/solution pass in and out by using valves.

8 Claims, 3 Drawing Sheets

METHOD FOR PRODUCING HYDROGEN BY USING MAGNESIUM SCRAP AND APPARATUS THEREOF

BACKGROUND OF THE INVENTION

1. Field of the Invention

The present invention relates to a method for producing hydrogen by using magnesium scrap and an apparatus thereof, and particularly to a method for producing hydrogen by spontaneous chemical reaction without consumption of extra energy.

2. Related Art

In recent years, fossil sources are excessively exploited and utilized, taking a risk of energy shortage and environmental pollution. Consequently, hydrogen-based energy recycle gradually takes the place of the fossil-based carbon energy recycle. Although hydrogen exists in the earth's crust under particular conditions, it is too little in quantity to be exploited or recycled. As a result, production of hydrogen has to rely on artificial technology.

Nowadays, industrial production of hydrogen mostly employs fossil fuels (petroleum, savageness, coal and etc.) to generate hydrogen by different processes, for example steam reforming, partial oxidation and gasification. In view of human ecology, these hydrogen production processes using fossil fuels generate a lot of carbon dioxide (which brings about earth's greenhouse effect) and other contaminants. Hydrogen production method eliminating secondary pollution, instead of using fossil fuels, is economical and environment-protective, and therefore meets the tendency of hydrogen source development.

Electrolysis of water is a relatively easy and clean way for producing hydrogen. However, it consumes a great deal of power, requiring high production cost, and correspondingly, cannot accord with long-term environment protection. Saving power is needed in hydrogen production to obtain actual environment-protective effect. Currently, a new method for producing hydrogen attracts people's attention, where $NaBH_4$ is immersed in alkaline solution, and then hydrogen is generated by using catalyst, such as Ru, Pt, etc. The hydrogen is readily and quickly produced by this method. But $NaBH_4$ has to be abstracted from borate ore. Abstraction of 1 kilogram $NaBH_4$ costs about 80 dollars, and borate ore is mostly collected in several countries, for instance the United States and Turkey. So this method is not economical, either.

In addition, metal scrap is used to recycle hydrogen. As an example, aluminum scrap is grinded to powder and acquires high chemical vigor. The aluminum is put into the sodium hydroxide solution, generating hydrogen. It's reported in documentations that magnesium powder serves as source for producing hydrogen. However, in these methods, these metals as source for producing hydrogen, namely aluminum powder and magnesium powder, need to be firstly grinded to tiny powder, which often takes extra energy and elevates cost. Additionally, the metal powder has to be stored rather careful to avoid powder blast.

On the other hand, some research involves that recycled aluminum can serve as material for producing hydrogen. However plastic coated on recycled aluminum can has to be cleaned out by vitriolic solution, which also produces industrial waste liquid.

Thus, a method which is high efficient and takes less energy without secondary pollution is desired.

SUMMARY OF THE INVENTION

Accordingly, an object of the present invention is to provide a method for producing hydrogen by using magnesium scrap and an apparatus thereof, which is more efficient than traditional hydrogen generation methods.

Another object of the present invention is to provide a method for producing hydrogen by magnesium scrap and an apparatus thereof, which prevents from secondary pollution.

A further object of the present invention is to provide a method for producing hydrogen by magnesium scrap and an apparatus thereof, which consumes less power than traditional hydrogen generation methods and which is economic.

According to one aspect of the present invention, a method for producing hydrogen by magnesium scrap is provided.

Firstly, at least a platinum-coating titanium mesh is provided as catalyst of hydrogen production reaction. In a preferred embodiment, a platinum film is plated on the titanium mesh to form the platinum-coating titanium mesh. Magnesium alloy scrap is heated to form melted magnesium scrap. In a preferred embodiment, the melted magnesium scrap has temperature between 570.degree.C. and 580.degree.C. The melted magnesium scraps are adhered to the platinum-coating titanium meshes to form magnesium alloy-platinum-coating titanium combination as material of hydrogen production reaction.

Secondly, magnesium alloy-platinum-coating titanium combination is put in an airtight reaction chamber. Sodium chloride solution of 3.5 wt. % is loaded in the airtight reaction chamber. A valve of airtight reaction chamber is not closed until solution reaches a prescribed quantity. A spontaneously hydrogen producing reaction is carried out.

Finally, the gas produced by the reaction is conducted to a low temperature exsiccator for condensing the vapor involved in the gas. Next, the gas is collected by a collector immediately.

According to another aspect of the present invention, the apparatus for producing hydrogen comprises a liquid container, an airtight reaction chamber, a motor, a cooler, a low temperature exsiccator, and a gas collector. Ducts connect with each component and control the gas/solution pass in and out by valves.

The liquid container is provided to store sodium chloride solution. The motor loads the sodium chloride solution from the liquid container to the airtight reaction chamber. The airtight reaction chamber accommodates the sodium chloride solution and a plurality of platinum-coating titanium meshes for performing hydrogen production reaction. A duct connects the liquid container and the airtight reaction chamber, and a valve is provided to control quantity of the sodium chloride solution entering into the airtight reaction chamber. The cooler adjusts temperature of the sodium chloride solution in the airtight reaction chamber. In terms of a preferred embodiment, a thermocouple is provided to immerse into the sodium chloride solution in the airtight reaction chamber for monitoring temperature varying of the reaction system. The cooler adjusts the temperature of the sodium chloride solution to sustain the temperature under 30.degree.C.

A duct connects the low temperature exsiccator and the airtight reaction chamber. The gas produced by the hydrogen production reaction passes through the low temperature exsiccator, and condenses vapor involved in the gas. A gas collector connects with the low temperature exsiccator by a duct for collecting the gas produced by the hydrogen production reaction. In accordance with a preferred embodiment, a gas mass flow meter is mounted between the low temperature exsiccator and the gas collector for real-time supervising ratio of the gas and time change. In a preferred embodiment, a gas sampling packet specific for gas chromatography is mounted on the duct of the gas collector, and controls flux by a valve. A part of gas, which passes through the gas mass flow meter, is collected, and is analyzed by the gas chromatography to acquire components of the gas.

According to embodiments of the present invention, the method for producing hydrogen of the present invention is highly efficient than prior methods for producing hydrogen. Moreover, the platinum-coating titanium meshes can be used repeatedly, assuring high production efficiency. Consequently, the present invention has the following advantages:

1. The material for producing hydrogen is magnesium scrap. Magnesium alloy is popularly employed in 3C electronic products and automotive components, and correspondingly, more and more magnesium scraps, for example, magnesium shells, components and mechanisms, would be produced in future. In the instant invention, the magnesium scraps is recycled to produce hydrogen energy of economic value, which does not only produce mass energy, but also promotes recycling of resources, contributing to long-running environment protection.

2. In the instant invention, magnesium scraps and sodium chloride solution serve as material of reaction, and platinum-coating titanium meshes serve as catalyst for a spontaneously hydrogen producing reaction. These materials are readily obtained and cheap. The magnesium scraps produce hydrogen efficiently without need of extra energy in the reaction. The platinum-coating titanium mesh is cheap and used repeatably, and therefore assures consistent efficient hydrogen production, reducing cost and promoting yield of hydrogen.

In order to further illustrate features, operating methods, objects and advantages of the instant invention, embodiments of the instant invention are described below accompanying with drawings.

DESCRIPTION OF THE PREFERRED EMBODIMENTS

Figure 1:
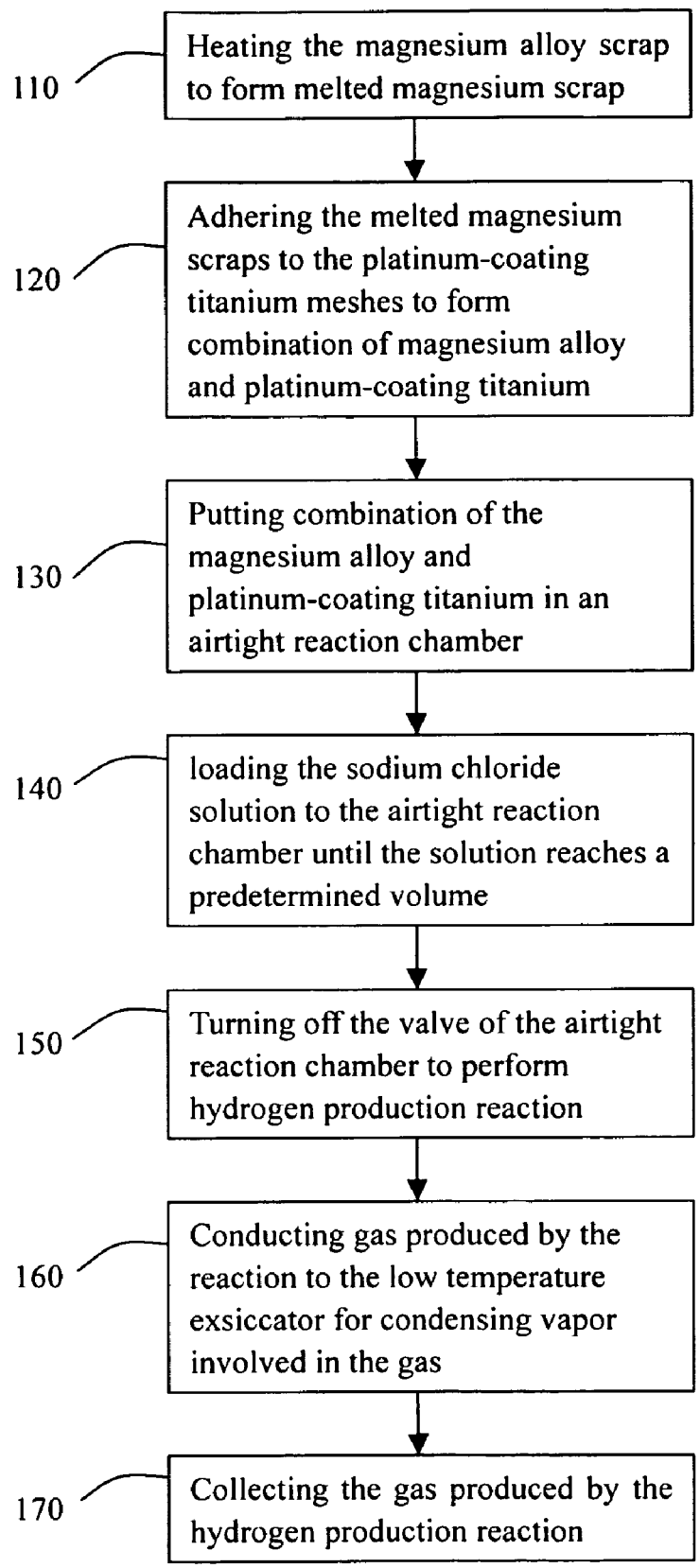
FIG. 1 is a flow chart of a method for producing hydrogen by using magnesium scrap in accordance with a preferred embodiment of the present invention.

FIG. 1 is a flow chart of a method for producing hydrogen by using magnesium scrap in accordance with a preferred embodiment of the present invention.

As shown in Step 110, the magnesium alloy scrap is heated to form melted magnesium scrap. The melted magnesium scrap is at temperature ranged from 570.degree.C. to 580.degree.C.

Figure 2:
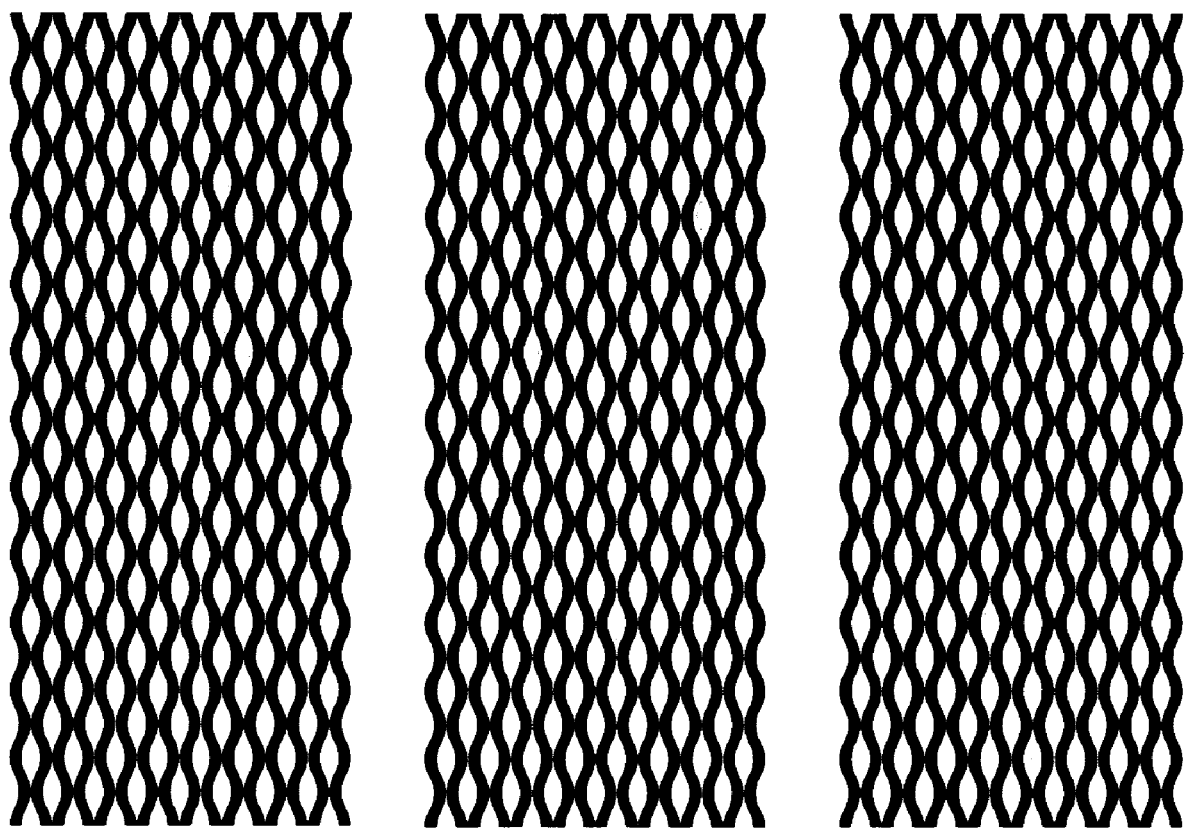
FIG. 2 is a depiction of a platinum-coating titanium meshes.

As shown in Step 120, appropriate quantity of melted magnesium scraps are adhered to the platinum-coating titanium meshes to for a magnesium alloy-platinum-coating titanium combination as material of hydrogen production reaction. FIG. 2 shows platinum-coating titanium meshes. In a preferred embodiment, a platinum film of 2~3 micron width is plated on surfaces of a titanium mesh to form a platinum-coating titanium mesh. Each sheet of platinum-coating titanium mesh is dimensioned of 2*8 square centimeters or an appropriate size as desired. In a preferred embodiment, the platinum-coating titanium meshes may be used repeatably by removing used magnesium scraps therefrom and then adhering new magnesium scraps thereto.

Figure 3:
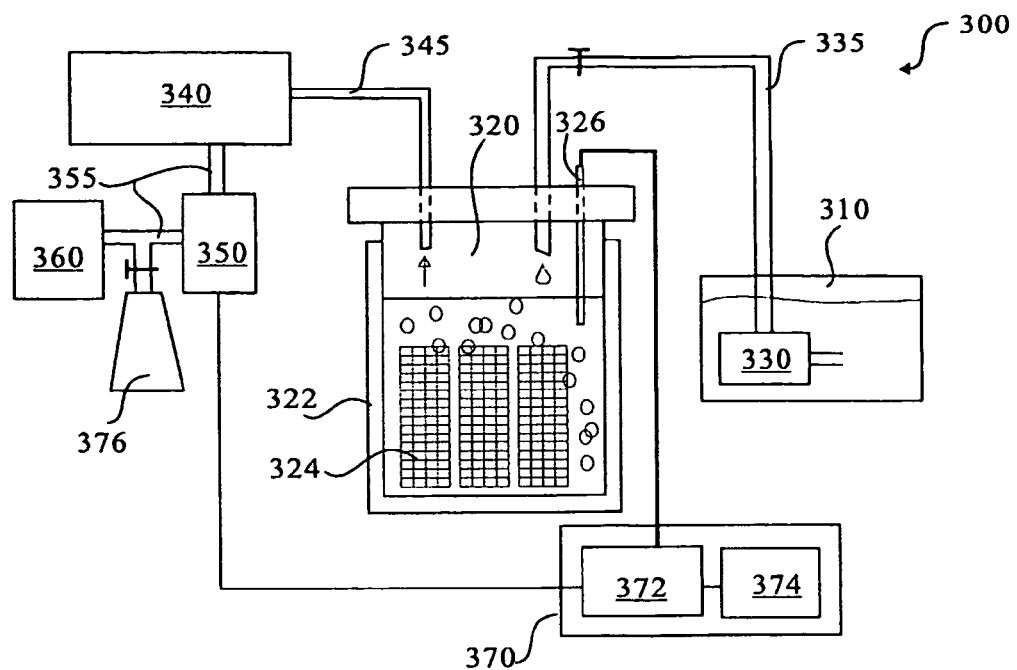
FIG. 3 is a schematic view of apparatus for producing hydrogen of the present invention.

As shown in Step 130, magnesium alloy-platinum-coating titanium combination is put in an airtight reaction chamber. FIG. 3 is a schematic view of apparatus for producing hydrogen. The apparatus 300 for producing hydrogen at least comprises a liquid container 310, an airtight reaction chamber 320, a motor 330, a cooler 322, a low temperature exsiccator 340, a gas mass flow meter 350 and a gas collector 360.

The liquid container 310 is provided to store sodium chloride solution. According to an embodiment of the present invention, sodium chloride solution of 3.5 weight percent concentration and about 24.degree.C.~30.degree.C. temperature is loaded in the airtight reaction chamber 320 for producing hydrogen. The sodium chloride solution and a plurality of platinum-coating titanium meshes are put in the airtight reaction chamber 320. The motor 330 is provided to load sodium chloride solution from the liquid container 310 to the airtight reaction chamber 320. A dust 335 connects the liquid container 310 and the airtight reaction chamber 320. A valve controls quantity of the sodium chloride solution entering into the airtight reaction chamber 320.

The hydrogen production reaction is an exothermic reaction. The temperature of the sodium chloride solution in the airtight reaction chamber 32 goes up gradually during the reaction. In terms of an embodiment, a thermocouple 326 and a cooler 322 are provided in the airtight reaction chamber 320. The thermocouple 326 is immersed into the sodium chloride solution in the airtight reaction chamber 320 for monitoring temperature varying of the reaction system. The cooler 322 adjusts temperature of the sodium chloride solution in the airtight reaction chamber 320. The cooler 322 adjusts the temperature of the sodium chloride solution to sustain the temperature below 30° C.

As shown in Step 140, the motor 330 loads the sodium chloride solution and takes the sodium chloride solution through the dust 335 to the airtight reaction chamber 320. As solution reaches a predetermined quantity, in step 150, the valve of the airtight reaction chamber 320 is closed to perform hydrogen production reaction. The hydrogen production reaction lasts about 50~60 minutes. During the reaction, the platinum-coating titanium meshes 324 are regarded as catalyst to speed up reaction. The hydrogen production reaction is a spontaneous reaction without need of extra magnesium scraps. The reaction equation is disclosed as below:

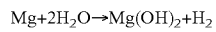

$$Mg+2H_2O \rightarrow Mg(OH)_2+H_2$$

The reaction goes on in the sodium chloride solution (components of sea water). Besides eliminating extra energy consumption, facile material and low cost, magnesium hydroxide ($Mg(OH)_2$) byproducts are produced, which can act as flame retardant for fire protection.

As shown in Step 160, gas produced by the reaction is conducted to the low temperature exsiccator 340 for condensing vapor involved in the gas. Further referring to FIG. 3, the low temperature exsiccator 340 is connected with the airtight reaction chamber 320 by a duct 345. The duct 345 is an only exit of the airtight reaction chamber 320, which allows gas produced by the hydrogen production reaction passes the low temperature exsiccator 340 and condenses the vapor. According to a preferred embodiment, temperature of the low temperature exsiccator 340 is set at about −15.degree.C.±1.degree.C.

Finally, as shown in Step 170, a gas collector collects gas produced by hydrogen production reaction. Referring to FIG. 3, the gas collector 360 connects with the low temperature exsiccator 340 by a duct 355 for collecting the gas produced by the hydrogen production reaction. In accordance with a preferred embodiment, a gas mass flow meter 350 is mounted between the low temperature exsiccator 340 and the gas collector 360 for real-time supervising ratio of the gas and time change. In a preferred embodiment, the gas collector 360 further includes a gas sampling packet 376 specific for gas chromatography to analyze gas sample by a gas chromatography.

In accordance with a preferred embodiment, the hydrogen production apparatus 300 further comprises a real-time supervising system 370 having a data capture 372 connecting with a computer 374. The data capture 372 receives data from the gas mass flow meter 350 for real-time supervising relation of ratio of production and flux of the hydrogen, or temperature varying detected by the thermocouple 326 for real-time adjusting temperature of sodium chloride solution in the airtight reaction chamber 320 for maintaining reaction. The computer 374 is adapted to process, analyze and store data input by the data capture 372.

Embodiment 1

40 sheets of platinum-coating titanium meshes with the magnesium scraps adhering thereto are prepared for producing hydrogen. After a constant period of time (about 50-56 minutes), removing remains on the platinum-coating titanium meshes. Appropriate quantity of magnesium scraps are adhered again for next test, whereby it is known whether efficiency of hydrogen production descends after the platinum-coating titanium meshes are used repeatedly.

Figure 4:
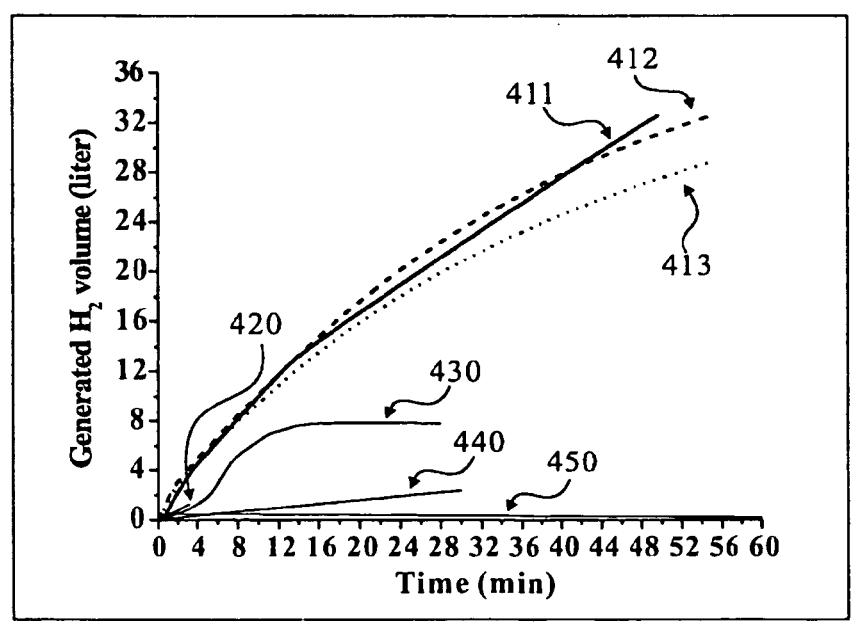
FIG. 4 is a relation diagram of time and accumulation of hydrogen produced by the method according to the present invention, and comparison of efficiency of other hydrogen production methods with the efficiency of the instant invention.

FIG. 4 is a relation diagram of time and accumulation of hydrogen produced by the method according to the instant invention. The horizontal axis stands for time (minute, min) of the reaction, while the vertical axis stands for volume of hydrogen (liter, liter). The curves 411, 412, 412 respectively represent relation of hydrogen quantity and time when the platinum-coating titanium meshes are used repeatedly. The curve 411 dictates the state when the magnesium scraps are adhered to the platinum-coating titanium meshes at the first time, the curve 412 dictates the state at the second time, and the curve 413 dictates the state at the third time.

The result shows that, volume of hydrogen always reaches about 28 liters when time is 50 minutes, which proves that the platinum-coating titanium meshes work well in repeated use, and efficiency of hydrogen production each time is rather similar. In the three experiments, volume of hydrogen and the consumed magnesium weight is as following: 1.14 liter/gram of magnesium weight at the first time, 0.90 liter/gram of magnesium weight at the second time, 0.94 liter/gram of magnesium weight at the third time. The purity of the hydrogen is 97.2 molar percent or so, the other components are vapor. It is notable that anode and cathode of PEMFC need vapor, and the instant invention exactly meets this need. As a result, gas produced by the instant invention can be directly introduced into the PEMFC without extra wetting, which is a novel feature of the instant invention.

FIG. 4 also depicts comparison of efficiency of other hydrogen production methods with the efficiency of the instant invention. The curve 420 and the curve 430 respectively show aluminum can and aluminum powder reacts with sodium hydroxide to produce hydrogen. The curve 440 shows NaBH4 solution reacts with Ru catalyst to produce hydrogen. The curve 450 shows magnesium powder reacts with potassium chloride to produce hydrogen. FIG. 4 evidently shows efficiency of the four prior methods are all far lower than efficiency of the instant invention.

Therefore, the instant invention has merits as below.

Firstly, in the instant invention, magnesium scraps and sodium chloride solution serve as reaction material in the hydrogen production reaction, and the platinum-coating titanium meshes act as catalyst to conduct spontaneous hydrogen production reaction. The materials are easily acquired and low cost, and react in the hydrogen production reaction without need of extra energy. Efficiency of the instant invention is far higher than traditional hydrogen production methods. Correspondingly, hydrogen production method of the instant invention markedly decrease cost and increase yield.

Secondly, hydrogen production method of the instant invention does not produce secondary pollution and protects environment. Moreover, byproduct magnesium hydroxide of the hydrogen production method may serve as flame retardant for fire protection, and therefore promotes additional value as for high industrial utility.

Thirdly, in the instant invention, vapor is involved in the hydrogen gas and may be directly introduced into proton exchange fuel cell without wetting. Thus, production steps and complexity are reduced, and the instant invention can join current technology to be directly applied to the industry.

The method of the instant invention employs recycled magnesium scraps to produce economic hydrogen, which is a low cost and high yield energy generation method, and promotes reuse of source for long-term environment protection.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A method for producing hydrogen by using magnesium scrap, comprising:
    a) providing at least a platinum-coating titanium mesh;
    b) heating magnesium scrap to form melted magnesium scrap;
    c) adhering the melted magnesium scrap to the platinum-coating titanium meshes to form magnesium alloy-platinum-coating titanium combination;
    d) putting magnesium alloy-platinum-coating titanium combination in an airtight reaction chamber;
    e) loading aqueous sodium chloride solution of 3.5 weight percent in the airtight reaction chamber, a valve of airtight reaction chamber being closed when solution reaches a prescribed quantity for carrying out spontaneously hydrogen producing reaction; and
    f) the gas produced by the reaction being conducted from an exit of the airtight reaction chamber to a low temperature exsiccator for condensing vapor involved in the gas, and collecting the gas.

2. The method for producing hydrogen by using magnesium scrap as claimed in claim 1, wherein a platinum film of 2-3 micron width is plated on surfaces of a titanium mesh to form a platinum-coating titanium mesh.

3. The method for producing hydrogen by using magnesium scrap as claimed in claim 1, wherein the melted magnesium scrap is at temperature between 570.degree.C. and 580.degree.C.

4. The method for producing hydrogen by using magnesium scrap as claimed in claim 1, wherein the 3.5 weight percent sodium chloride solution is at temperature about 24.degree.C.-30.degree.C.

5. The method for producing hydrogen by using magnesium scrap as claimed in claim 1, wherein the hydrogen production reaction is a spontaneous reaction without need of extra magnesium scraps, and the reaction equation is as following:

$$Mg+2H_2O \rightarrow Mg(OH)_2+H_2$$

6. The method for producing hydrogen by using magnesium scrap as claimed in claim 1, wherein the hydrogen production reaction lasts about 50-60 minutes.

7. The method for producing hydrogen by using magnesium scrap as claimed in claim 5, further comprising: removing remains on the platinum-coating titanium mesh and adhering the melted magnesium scrap to the platinum-coating titanium mesh again for repeatedly using the platinum-coating titanium mesh.

8. The method for producing hydrogen by using magnesium scrap as claimed in claim 1, wherein the low temperature exsiccator is set at temperature about −15.degree.C.±1.degree.C.

* * * * *